United States Patent
Khan (10) Patent No.: US 8,588,147 B2
(45) Date of Patent: Nov. 19, 2013

(54) METHOD AND SYSTEM FOR SUBCARRIER DIVISION DUPLEXING

(75) Inventor: Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 963 days.

(21) Appl. No.: 12/268,976

(22) Filed: Nov. 11, 2008

(65) Prior Publication Data

US 2009/0131064 A1 May 21, 2009

Related U.S. Application Data (60) Provisional application No. 60/996,527, filed on Nov. 21, 2007.

(51) Int. Cl.
*H04W 4/00* (2009.01)

(52) U.S. Cl.
USPC .......................................... 370/329; 370/208

(58) Field of Classification Search
USPC ......... 370/203, 206, 208, 207, 240, 241, 280, 370/312, 310, 328, 329, 336, 342, 350, 474, 370/480; 455/452.2, 418, 450, 16, 17, 61.1, 455/63.3, 63.1, 101, 132, 127.4, 161.1, 455/553.1, 552.1, 522, 503, 509; 375/260, 375/303, 295, 340
See application file for complete search history.

(56) References Cited

U.S. PATENT DOCUMENTS

| | | | | |
|---|---|---|---|---|
| 5,481,545 | A * | 1/1996 | Maedjaja et al. | 370/327 |
| 6,785,514 | B1 * | 8/2004 | Raaf | 455/63.3 |
| 7,787,897 | B2 * | 8/2010 | Banh et al. | 455/522 |
| 2001/0033562 | A1 * | 10/2001 | Schilling | 370/342 |
| 2002/0086691 | A1 * | 7/2002 | Kostic et al. | 455/503 |
| 2003/0016622 | A1 * | 1/2003 | McCarty, Jr. | 370/207 |
| 2004/0114504 | A1 * | 6/2004 | Jung et al. | 370/203 |
| 2005/0111406 | A1 * | 5/2005 | Pasanen et al. | 370/329 |
| 2006/0013325 | A1 * | 1/2006 | Agrawal et al. | 375/260 |
| 2006/0171354 | A1 * | 8/2006 | Tee et al. | 370/329 |
| 2006/0209755 | A1 * | 9/2006 | Khan et al. | 370/329 |
| 2007/0036064 | A1 * | 2/2007 | Song et al. | 370/206 |
| 2007/0152980 | A1 * | 7/2007 | Kocienda et al. | 345/173 |
| 2007/0223419 | A1 * | 9/2007 | Ji et al. | 370/329 |
| 2007/0232349 | A1 * | 10/2007 | Jones et al. | 455/552.1 |
| 2007/0254693 | A1 * | 11/2007 | Furukawa | 455/553.1 |
| 2007/0258417 | A1 * | 11/2007 | Harvey et al. | 370/338 |
| 2007/0286156 | A1 * | 12/2007 | Gormley et al. | 370/350 |
| 2007/0297323 | A1 * | 12/2007 | Seki | 370/208 |
| 2008/0025433 | A1 * | 1/2008 | Deguchi | 375/295 |
| 2008/0037672 | A1 * | 2/2008 | Yun et al. | 375/260 |
| 2008/0039133 | A1 * | 2/2008 | Ma et al. | 455/552.1 |
| 2008/0056183 | A1 * | 3/2008 | Gorokhov et al. | 370/329 |
| 2008/0070586 | A1 * | 3/2008 | Kermoal et al. | 455/452.2 |
| 2009/0010345 | A1 * | 1/2009 | Yang et al. | 375/260 |
| 2009/0086832 | A1 * | 4/2009 | Tarokh et al. | 375/260 |

(Continued)

*Primary Examiner* — Abdullah Riyami (57) ABSTRACT

A wireless communication network comprising a plurality of base stations capable of wireless communication with a plurality of subscriber stations within a coverage area of the network, wherein at least one base station of the plurality of base stations is capable of assigning available subcarriers in a bandwidth to one of a set of transition guard sub-carriers and a set of communication subcarriers, wherein the set of transition guard sub-carriers are non-identical to and overlap a set of transition guard subcarriers of a neighboring base station.

20 Claims, 9 Drawing Sheets

(56) References Cited

U.S. PATENT DOCUMENTS

| | | |
|---|---|---|
| 2009/0135756 A1* | 5/2009 | Kostic et al. .................. 370/312 |
| 2009/0136036 A1* | 5/2009 | Okada ........................... 380/272 |
| 2009/0219802 A1* | 9/2009 | Han et al. ...................... 370/210 |
| 2009/0304120 A1* | 12/2009 | Agrawal et al. ............... 375/340 |
| 2009/0323603 A1* | 12/2009 | Kwon et al. ................... 370/329 |
| 2010/0040086 A1* | 2/2010 | Kimura et al. ................ 370/474 |
| 2010/0074151 A1* | 3/2010 | Westerberg et al. .......... 370/280 |
| 2010/0118706 A1* | 5/2010 | Parkvall et al. ............... 370/241 |
| 2010/0220666 A1* | 9/2010 | Imamura et al. .............. 370/329 |
| 2010/0278084 A1* | 11/2010 | Jones et al. ................... 370/281 |
| 2010/0284320 A1* | 11/2010 | Kostic et al. .................. 370/312 |

* cited by examiner

METHOD AND SYSTEM FOR SUBCARRIER DIVISION DUPLEXING

CROSS-REFERENCE TO RELATED APPLICATION(S) AND CLAIM OF PRIORITY

The present application is related to U.S. Provisional Patent No. 60/996,527, filed Nov. 21, 2007, entitled "METHOD AND SYSTEM FOR SUBCARRIER DIVISION DUPLEXING". Provisional Patent No. 60/996,527 is assigned to the assignee of the present application and is hereby incorporated by reference into the present application as if fully set forth herein. The present application hereby claims priority under 35 U.S.C. §119(e) to U.S. Provisional Patent No. 60/996,527.

TECHNICAL FIELD OF THE INVENTION

The present application relates generally to wireless communications and, more specifically, to a technique for subcarrier division duplexing.

BACKGROUND OF THE INVENTION

The total bandwidth in an Orthogonal Frequency Division Multiplexing (OFDM) system is divided into narrowband frequency units called subcarriers. The number of subcarriers is equal to the Fast Fourier Transform/inverse Fast Fourier Transform (FFT/IFFT) size N used in the system.

Currently-implemented OFDM networks use either a frequency division duplexing (FDD) or a time division duplexing (TDD) scheme. In FDD-based communication systems, the uplink uses a different frequency band from the downlink. Typically, these systems make use of symmetric spectrum allocation, i.e., the bandwidth allocated to the downlink is the same as in the uplink. Disadvantages of this approach include the use of a fixed spectrum band that is inflexible to reconfiguration of the uplink and downlink bandwidth to support different data rate and capacity requirements for different classes of service. In TDD-based communication systems, the uplink and the downlink share the same frequency band, but the uplink and downlink transmissions occur at different times. Thus, these systems provide flexible use of the spectrum between uplink and downlink. The disadvantages with this approach include delays in transmissions due to having to wait for the allotted transmission time and lower link budgets due to mobile stations not being able to transmit continuously.

The use of a sub-carrier division duplexing (SDD) scheme overcomes the disadvantages of FDD and TDD schemes by allowing the allocation of sub-carriers to be changed dynamically at any time based on network conditions. Thus, for example, if additional sub-carriers are needed for the downlink while the uplink is not being fully used, a base station may allocate more sub-carriers as downlink sub-carriers and less sub-carriers as uplink sub-carriers.

Edge guard sub-carriers are operable to provide a guard to protect against interference between communication using the sub-carriers assigned to the base station and frequency bands that may be assigned to other systems. Similarly, transition guard sub-carriers are operable to provide a guard to protect against interference between communication on the downlink sub-carriers and communication on the uplink sub-carriers.

Further description of dynamically allocating sub-carriers can be found in U.S. Published Patent Application No. 2006/0209755 A1, which is hereby incorporated by reference into the present application as if fully set forth herein.

Like OFDMA, a single-carrier FDMA (SC-FDMA) scheme also provides orthogonal access to multiple users simultaneously accessing the system. Another attractive feature of SC-FDMA in comparison to OFDMA is a low peak-to-average power ratio (PAPR) due to its single carrier transmission property. In an SC-FDMA scheme referred to as Interleaved Frequency Division Multiple Access (IFDMA), a data sequence is first repeated for a predetermined number of times. The repeated data sequence is then multiplied with a user-specific phase vector.

Another way of looking at this approach is FFT preceding the data sequence and then mapping the FFT-precoded data sequence to uniformly spaced subcarriers at the input of the IFFT. The uniform spacing is determined by the repetition factor Q. The multiplication of the repeated data sequence with a user-specific phase vector can be seen as a frequency shift in order to map transmissions from multiple users on non-overlapping orthogonal subcarriers. Although having each data modulation symbol spread out on all the subcarriers used by the user can provide frequency-diversity benefit in a frequency selective channel, there may be some impact on performance as well due to the loss of orthogonality or noise enhancement when data symbols experience frequency selective fading.

The mapping of FFT-precoded data sequence to contiguous subcarriers results in a localized transmission in the frequency domain. Similar to distributed mapping or DFDMA, localized mapping also results in a low PAPR signal. The distributed and localized mapping of FFT pre-coded data sequence to OFDM subcarriers is sometimes collectively referred to as Discrete Fourier Transform-Spread (OFDM DFT-Spread) OFDM.

Further description of FFT-precoding can be found in U.S. Published Patent Application No. 2006/0227888 A1, which is hereby incorporated by reference into the present application as if fully set forth herein.

However, in general, the number of subcarriers used for data transmission is still less than N because some subcarriers are used as transition guard sub-carriers, and typically no information is transmitted on transition guard sub-carriers.

Therefore, there is a need in the art for a system and method for allocating sub-carriers for communication in an OFDM network that allows the transition guard sub-carriers to be used for data transmission. In particular, there is a need for a subcarrier division duplexing scheme that allows the transition guard sub-carriers to be used for data transmission by neighbor cells.

SUMMARY OF THE INVENTION

A wireless communication network comprising a plurality of base stations capable of wireless communication with a plurality of subscriber stations within a coverage area of the network, wherein at least one base station of the plurality of base stations is capable of assigning available subcarriers in a bandwidth to one of a set of transition guard sub-carriers and a set of communication subcarriers, wherein the set of transition guard sub-carriers are non-identical to and overlap a set of transition guard subcarriers of a neighboring base station.

A base station capable of wireless communication with a plurality of subscriber stations within a coverage area of a network, where the base station is capable of assigning available subcarriers in a bandwidth to one of a set of transition guard sub-carriers and a set of communication subcarriers, wherein the set of transition guard sub-carriers are non-identical to and overlap a set of transition guard subcarriers of a neighboring base station.

A method of operating a base station comprising assigning available subcarriers in a bandwidth to one of a set of transition guard sub-carriers and a set of communication subcarriers, wherein the set of transition guard sub-carriers are non-identical to and overlap a set of transition guard subcarriers of a neighboring base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
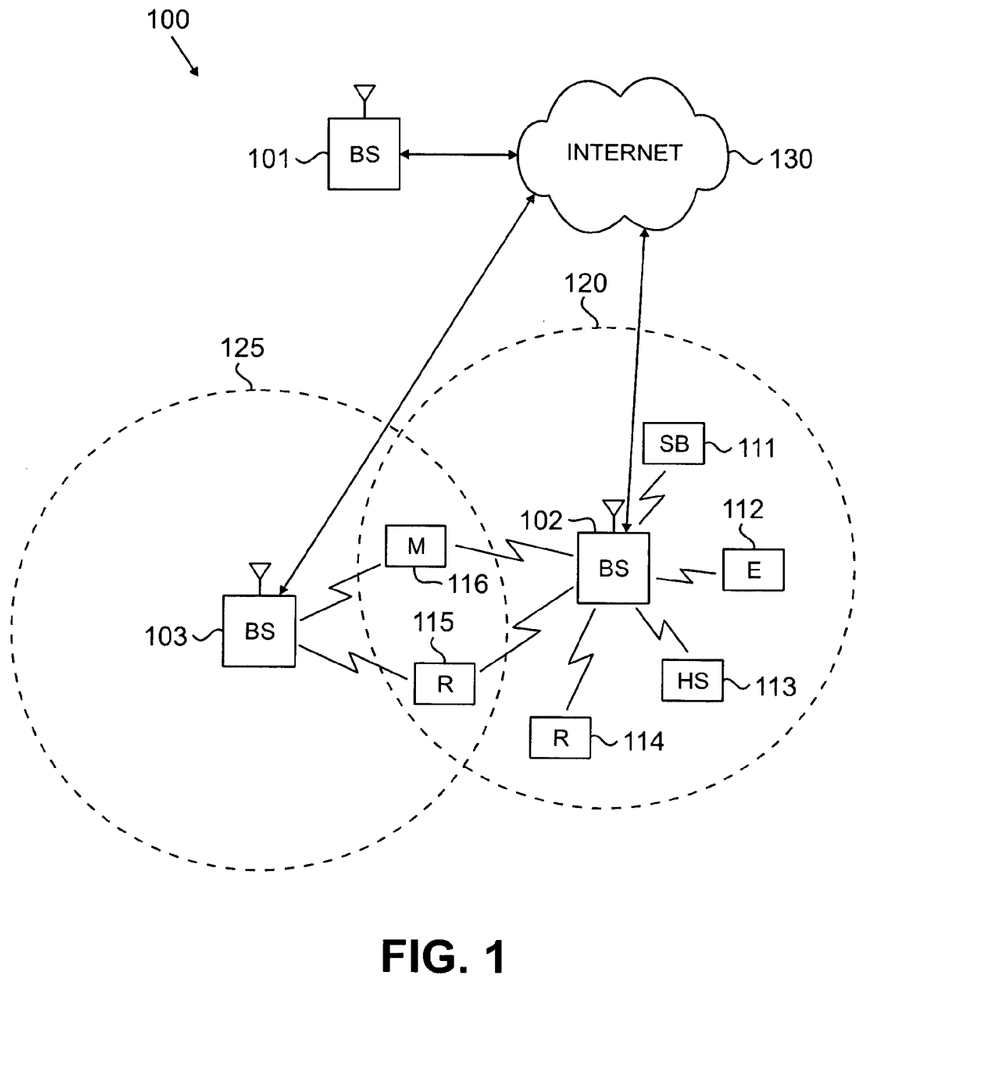
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R) and subscriber station 116, which may be a mobile device (M) such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
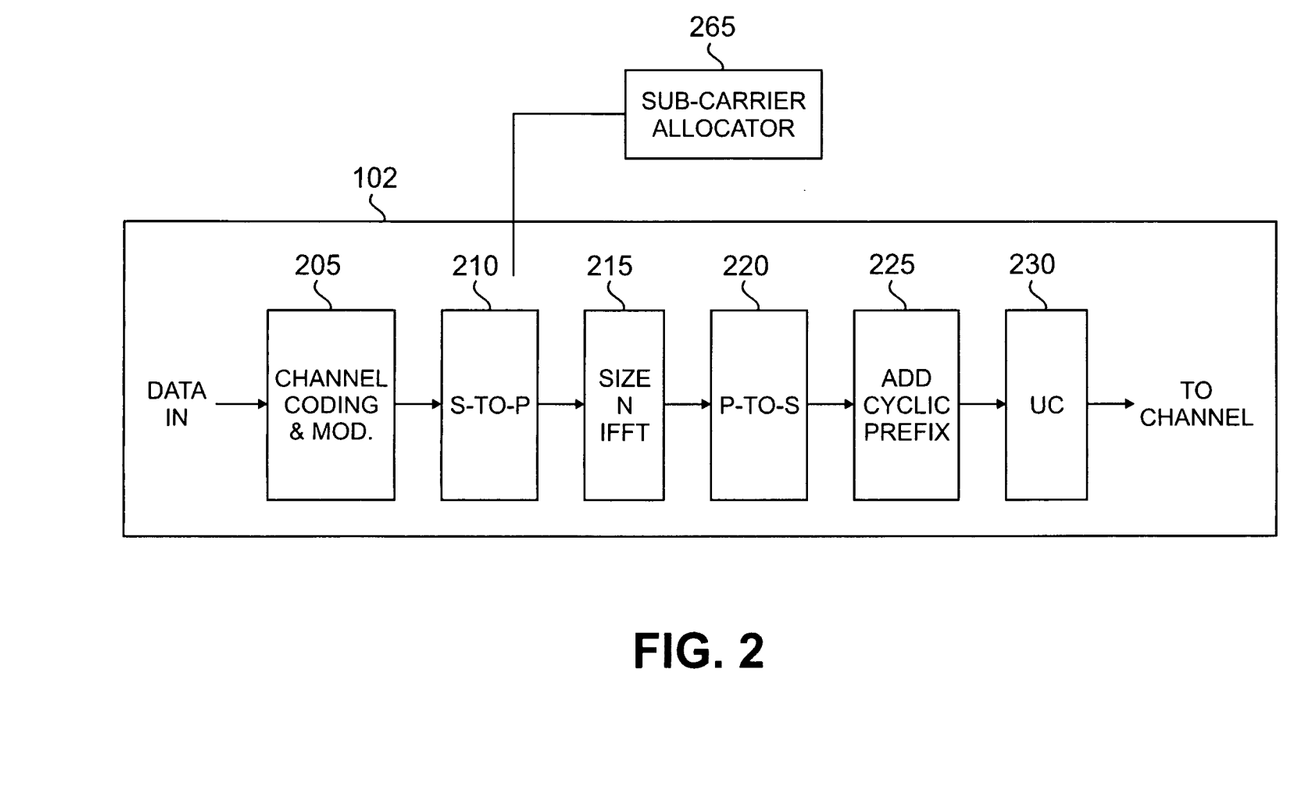
FIG. 2 is a high-level diagram of an OFDMA transmitter according to one embodiment of the present disclosure.
Figure 3:
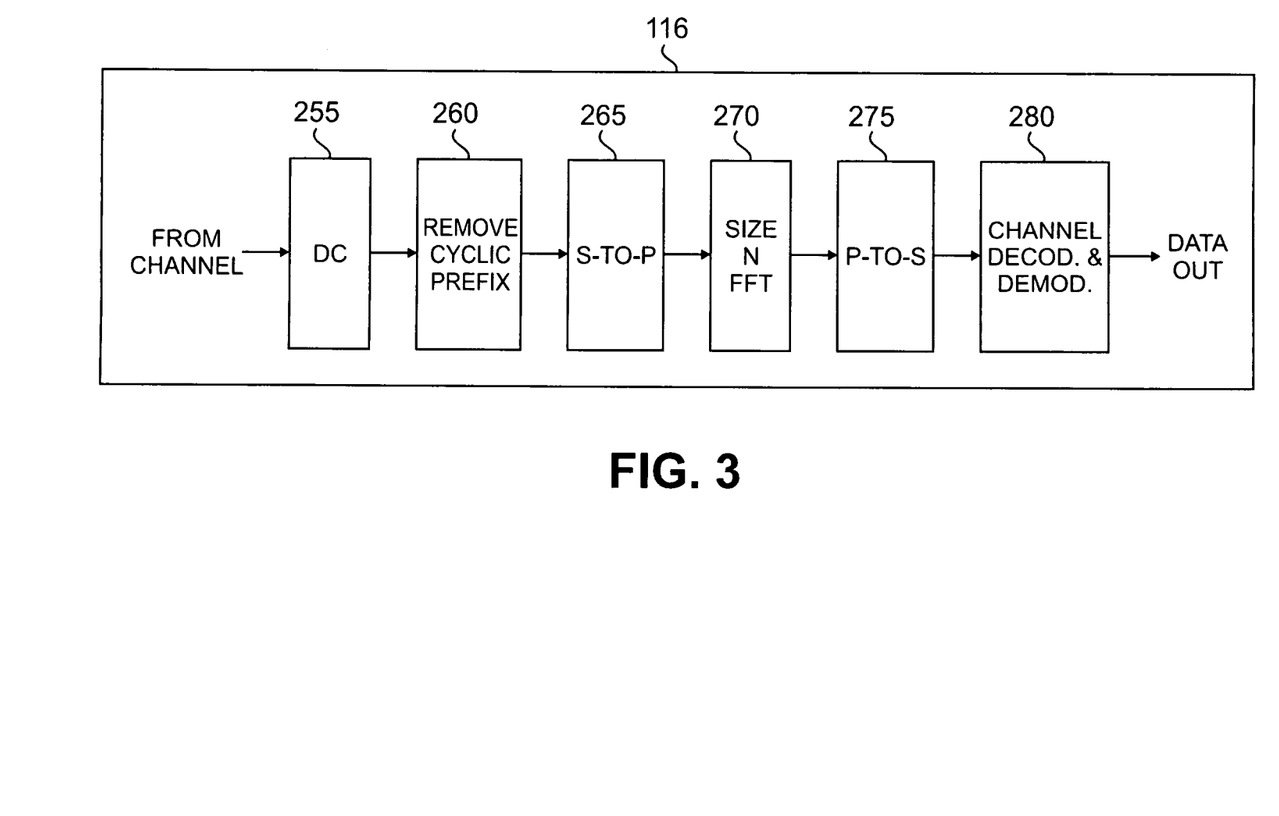
FIG. 3 is a high-level diagram of an OFDMA receiver according to one embodiment of the present disclosure.

FIG. 2 is a high-level diagram of an orthogonal frequency division multiple access (OFDMA) transmit path. FIG. 3 is a high-level diagram of an orthogonal frequency division multiple access (OFDMA) receive path. In FIGS. 2 and 3, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. Sub-carrier allocator 265 is operable to dynamically allocate sub-carriers for communication between base station 102 and subscriber stations 111-116 based on the network conditions.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for a subcarrier division duplexing scheme that allows the guard subcarriers to be used for data transmission by neighbor cells.

Figure 4:
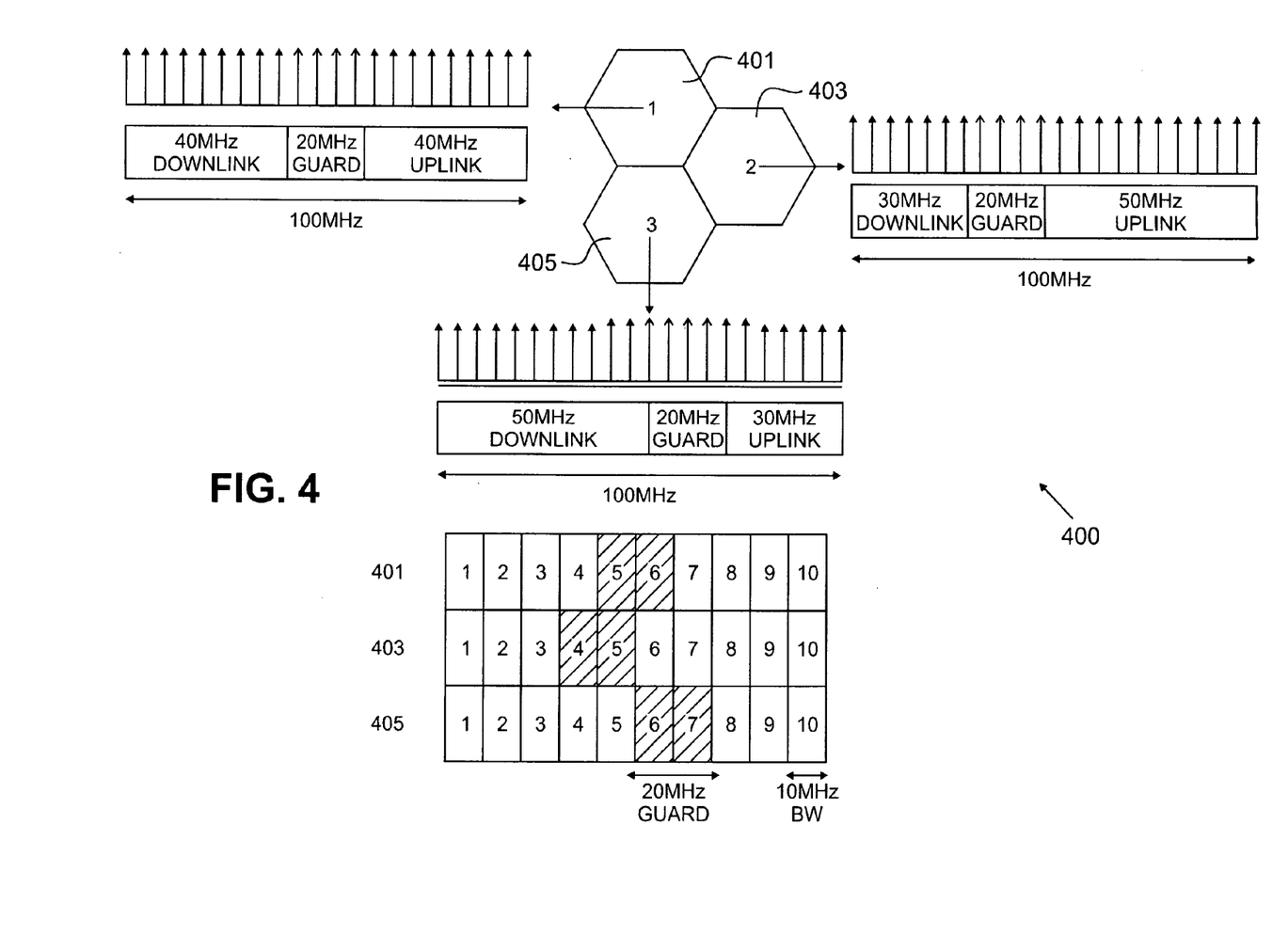
FIG. 4 illustrates a sub-carrier division duplexing (SDD) scheme for allocating sub-carriers for communication according to an embodiment of the present disclosure.

FIG. 4 illustrates a sub-carrier division duplexing (SDD) scheme 400 for allocating sub-carriers for communication according to an embodiment of the present disclosure.

In the embodiment shown in FIG. 4, the number of OFDMA/SC-FDMA subcarriers used between uplink and downlink can be different in different cells. Specifically, in a cell 401, 40 MHz is used for downlink and 40 MHz for uplink with a 20 MHz guard band in the middle (between 40-60 MHz). In a cell 403, 30 MHz is used for downlink while a 50 MHz spectrum is used for the uplink with a 20 MHz guard band between 30-50 MHz. In a cell 405, 50 MHz is used for the downlink while a 30 MHz spectrum is used for the uplink with a 20 MHz guard band between 50-70 MHz. Of course, it is understood that this allocation of sub-carriers may be changed dynamically at any time based on network conditions.

The advantage of such an allocation is that the guard band in one cell is used for transmission in the neighboring cells. This prevents the guard bands from being wasted and results in lower interference to the neighboring cells.

For example, in the $4^{th}$ 10 MHz band in the cell 401, there is a single interferer, which is the cell 405. In this embodiment, both the cells 401 and 405 can transmit data over the $4^{th}$ 10 MHz band, which is being set as a guard band in the cell 403. Also, the $5^{th}$ 10 MHz band in the cells 401 and 403 can be used by the cell 405 for data transmission. Similarly, the $6^{th}$ 10 MHz band in the cells 401 and 405 can be used by the cell 403 for data transmission, and the $7^{th}$ 10 MHz band in the cell 405 can be used by the cells 401 and 403 for data transmission.

Figure 5:
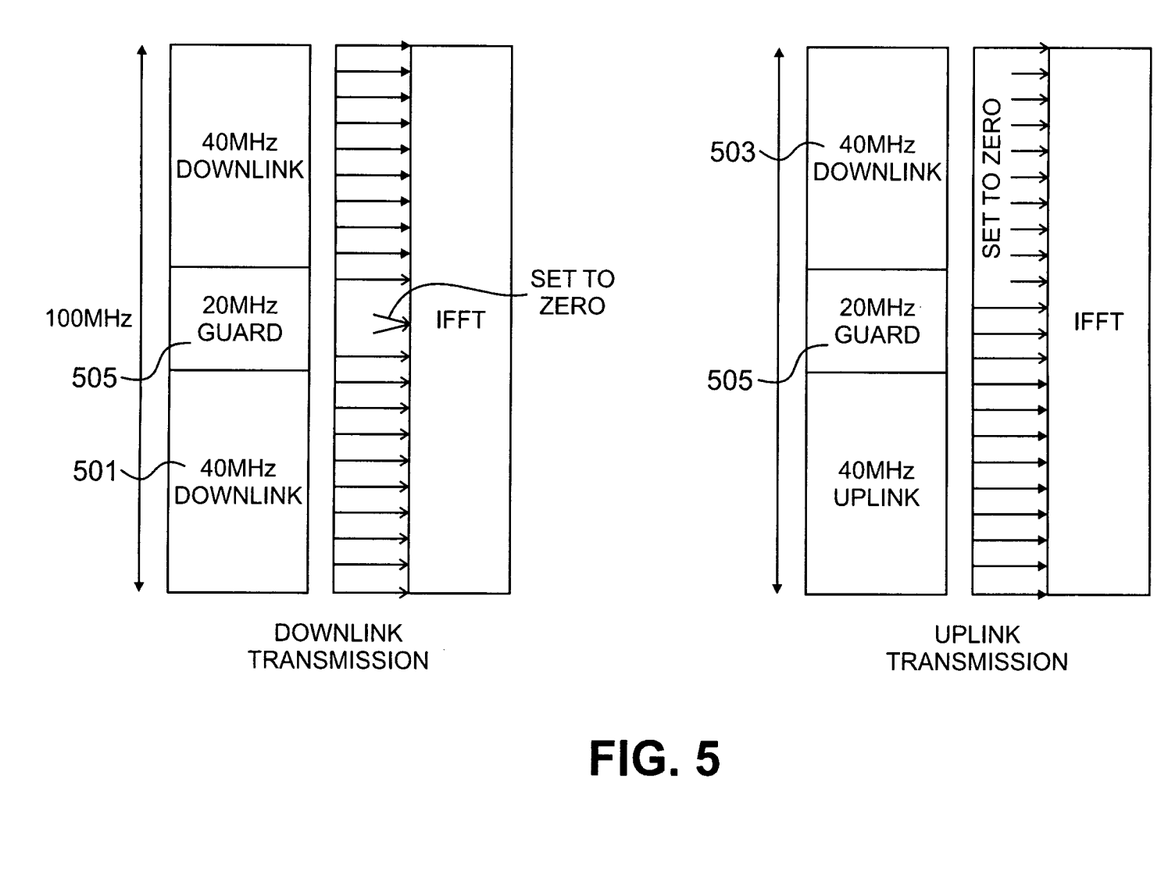
FIG. 5 illustrates a single FFT/IFFT covering a bandwidth being used both in a base station and a subscriber station.

FIG. 5 illustrates a single FFT/IFFT covering a 100 MHz bandwidth being used both in a base station and a subscriber station.

As shown in FIG. 5, when a base station performs a downlink transmission to multiple subscriber stations, the subcarriers used for uplink 501 are set to zero (i.e., no energy is being transmitted on these subcarriers). Similarly, the subscriber stations set the subcarriers used for downlink 503 to zero, and both the base station and subscriber stations set the subcarriers in the guard band 505 to zero.

Figure 6:
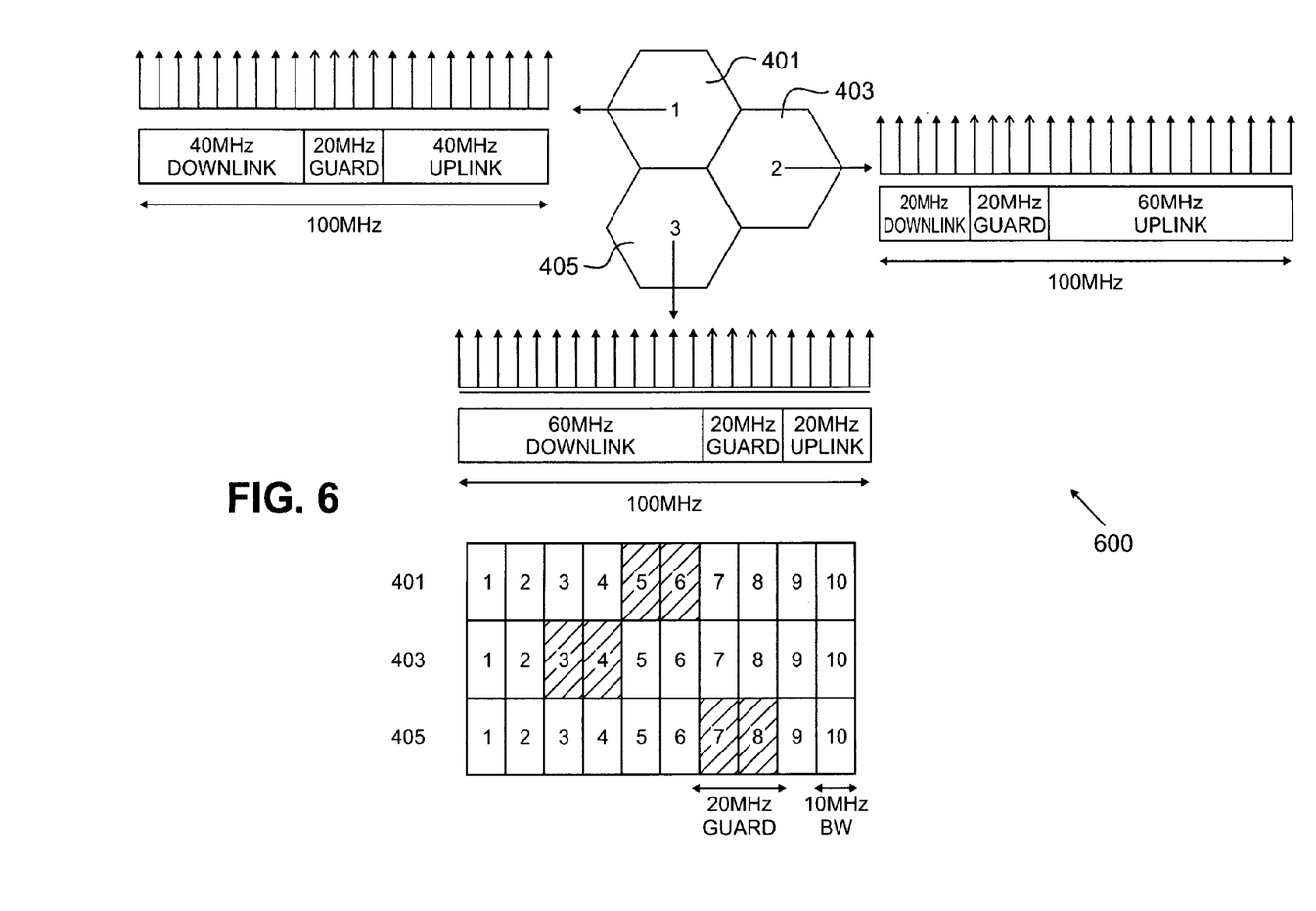
FIG. 6 illustrates a sub-carrier division duplexing (SDD) scheme for allocating sub-carriers for communication according to an embodiment of the present disclosure.

FIG. 6 illustrates a sub-carrier division duplexing (SDD) scheme 600 for allocating sub-carriers for communication according to an embodiment of the present disclosure.

In the embodiment shown in FIG. 6, the cell 401 uses 40 MHz for downlink and 40 MHz for uplink with a 20 MHz guard band in the middle (between 40-60 MHz). In the cell 403, 20 MHz is used for downlink while a 60 MHz spectrum is used for the uplink with a 20 MHz guard band between 20-40 MHz. In the cell 405, 60 MHz is used for the downlink while a 20 MHz spectrum is used for the uplink with a 20 MHz guard band between 60-80 MHz. Of course, it is understood that this allocation of sub-carriers may be changed dynamically at any time based on network conditions.

The advantage of such an allocation is that each cell only sees a single interfering cell in the $3^{rd}$ to $8^{th}$ 10 MHz bands.

Figure 7:
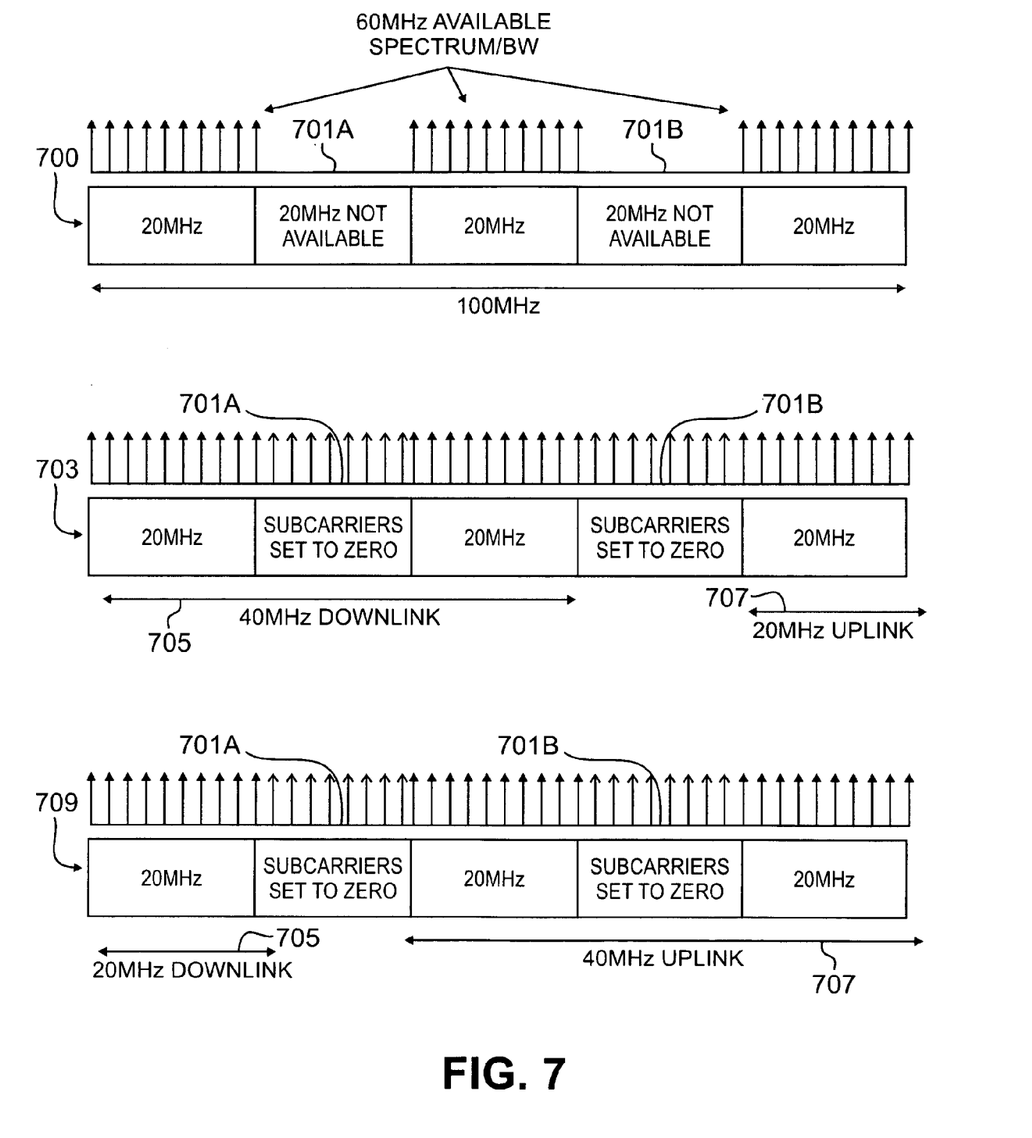
FIG. 7 illustrates sub-carrier division duplexing (SDD) schemes for allocating sub-carriers for communication when an available spectrum is non-contiguous according to an embodiment of the present disclosure.

FIG. 7 illustrates sub-carrier division duplexing (SDD) schemes for allocating sub-carriers for communication when an available spectrum is non-contiguous according to an embodiment of the present disclosure.

FIG. 7 illustrates an example bandwidth 700 in which a total available spectrum of 60 MHz is spread over a 100 MHz bandwidth. 20 MHz bands 701A and 701B in the range 20-40 MHz and 60-80 MHz are not available. The total spectrum of 60 MHz available can be shared between uplink and downlink in two configurations. In a first configuration 703, 40 MHz is used in the downlink 705 while 20 MHz is used in the uplink 707. In a second configuration 709, MHz is used in the downlink 705 while 40 MHz 707 is used in the uplink 707. The 20 MHz unused spectrum (one of the unavailable 20 MHz bands 701A and 701B) between uplink and downlink is set to zero, which reduces interference between uplink and downlink transmissions at both the base station and the subscriber station.

Figure 8:
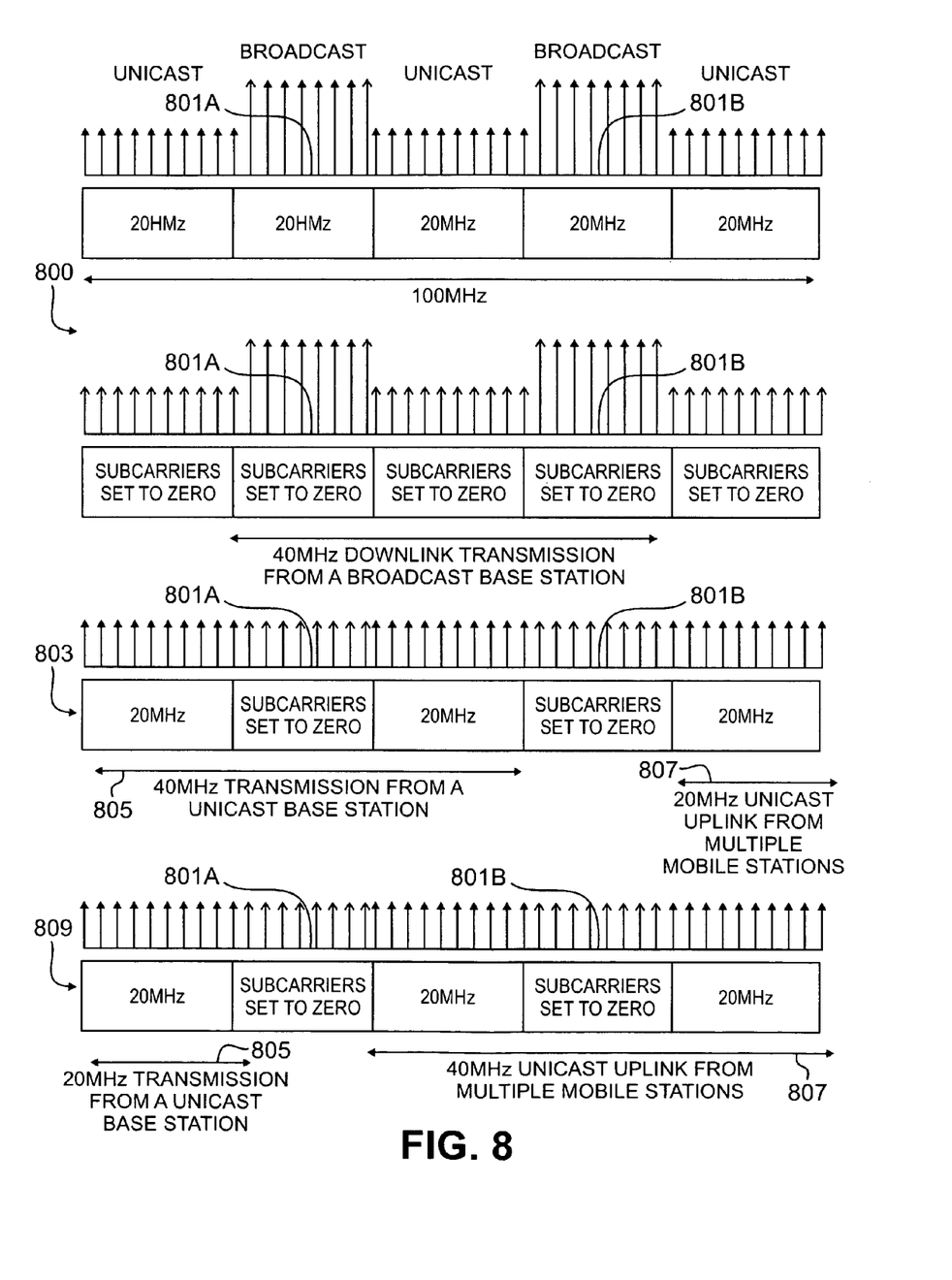
FIG. 8 illustrates sub-carrier division duplexing (SDD) schemes for allocating sub-carriers for communication when an available spectrum is shared between unicast uplink/downlink and broadcast according to an embodiment of the present disclosure.

FIG. 8 illustrates sub-carrier division duplexing (SDD) schemes for allocating sub-carriers for communication when an available spectrum is shared between unicast uplink/downlink and broadcast according to an embodiment of the present disclosure.

In this embodiment, a single FFT/IFFT is used for all broadcast and unicast uplink/downlink transmissions. The part of the bandwidth that is used for broadcast, for example, will not be used for unicast from the unicast base stations, and the subcarriers in this bandwidth will be set to zero. Similarly, the subcarriers used for unicast uplink/downlink will be set to zero in the broadcast base stations. The use of a single FFT/IFFT results in simpler receivers reducing the equipment cost. The use of a single FFT/IFFT also allows the bandwidth between the broadcast and the unicast uplink/downlink to be shared in a flexible manner. The unicast and broadcast base stations can be co-located, or they can be at different geographical locations. Also, the transmit powers can be different between the broadcast and unicast base stations.

FIG. 8 illustrates an example bandwidth 800 in which 20 MHz bands 801A and 801B in the range 20-40 and 60-80 MHz are used for broadcast. The remaining 60 MHz bandwidth is used for unicast uplink and downlink. In a first configuration 803, 40 MHz is used in the downlink 805 while 20 MHz is used in the uplink 807. In a second configuration 809, 20 MHz is used in the downlink 805 while 40 MHz is used in the uplink 807. The 20 MHz spectrum not used for unicast (one of the 20 MHz bands 801A and 801B used for broadcast) between the unicast uplink and downlink, which reduces interference between the uplink and downlink transmissions at both the base station and the subscriber station.

Although the above embodiments are described as having three cells by way of example only, it is understood that the above SDD schemes may be implemented using any number of cells in network 100. For simplicity, a 100 MHz spectrum is shown for communication in the above illustrated embodiments. However, it will be understood that the above SDD schemes may be implemented using any suitable spectrum.

Figure 9:
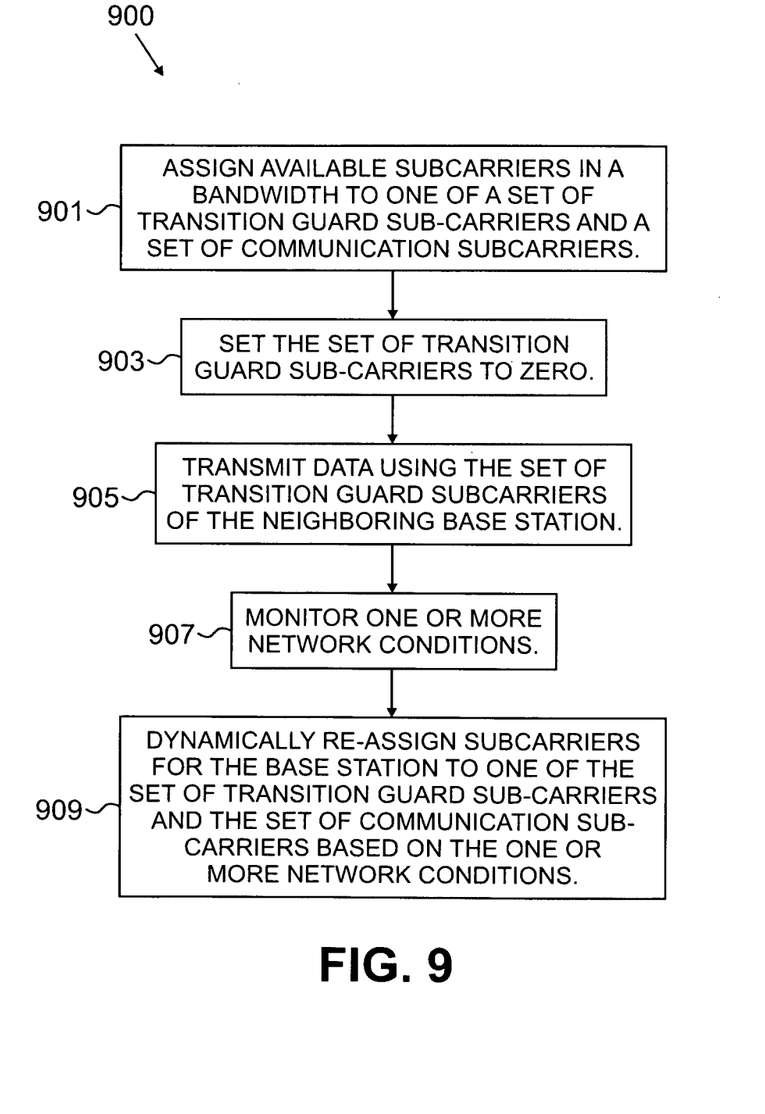
FIG. 9 is a flow diagram illustrating a method for allocating sub-carriers for communication according to an embodiment of the present disclosure.

FIG. 9 is a flow diagram illustrating a method 900 for allocating sub-carriers for communication according to an embodiment of the present disclosure.

A base station assigns available subcarriers in a bandwidth to one of a set of transition guard sub-carriers and a set of communication subcarriers (901). The set of transition guard sub-carriers are assigned in such a way that the set of transition guard sub-carriers are non-identical to and overlap a set of transition guard subcarriers of a neighboring base station. The set of transition guard sub-carriers are then set to zero (903). The base station also transmits data using the set of transition guard subcarriers of the neighboring base station (905). The base station further monitors one or more network conditions (907) and dynamically re-assigns subcarriers for the base station to one of the set of transition guard sub-carriers and the set of communication sub-carriers based on the one or more network conditions based on the one or more network conditions (909). The set of transition guard sub-carriers are re-assigned in such a way that the set of transition guard sub-carriers are non-identical to and overlap a set of transition guard subcarriers of a neighboring base station.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication network comprising:
   a plurality of base stations capable of wireless communication with a plurality of subscriber stations within a coverage area of the network, wherein a base station of the plurality of base stations is configured to assign a first set of available subcarriers in a bandwidth to a set of transition guard sub-carriers, assign a second set of the available subcarriers in the bandwidth to a set of communication sub-carriers that includes a set of transition guard subcarriers of a neighboring base station, and assign the set of transition guard subcarriers of the neighboring base station to one of uplink transmissions and downlink transmissions in a cell of the base station based on network conditions in the wireless communication network, and
   wherein the set of transition guard sub-carriers of the base station is non-identical to the set of transition guard subcarriers of the neighboring base station.

2. The network of claim 1, wherein the set of transition guard sub-carriers of the base station is set to zero.

3. The network of claim 1, wherein the set of transition guard subcarriers of the base station and the set of transition guard subcarriers of the neighboring base station use different frequency bands.

4. The network of claim 1, wherein the neighbor base station is configured to one of transmit and receive data using the set of transition guard subcarriers of the base station.

5. The network of claim 1, wherein a single Fast Fourier Transform/inverse Fast Fourier Transform (FFT/IFFT) covering the bandwidth is used in the base station and a subscriber station for transmission.

6. The network of claim 1, wherein the set of communication subcarriers are non-contiguous.

7. The network of claim 1, wherein one or more of the available subcarriers are shared between broadcast transmissions and unicast uplink/downlink transmissions.

8. The network of claim 1, wherein the base station is further configured to monitor one or more network conditions; and dynamically re-assign a number of subcarriers in the bandwidth for the uplink transmissions and the downlink transmissions in the cell of the base station by changing a frequency range of the set of transition guard sub-carriers of the base station based on the one or more network conditions,
   wherein the set of transition guard sub-carriers of the base station separates subcarriers for the uplink transmissions and subcarriers for the downlink transmissions and is non-identical to the set of transition guard sub-carriers of the neighboring base station.

9. An apparatus for wireless communication with a plurality of subscriber stations, the apparatus comprising:
   a base station configured to assign a first set of available subcarriers in a bandwidth to a set of transition guard sub-carriers, assign a second set of the available subcarriers in the bandwidth to a set of communication subcarriers that includes a set of transition guard subcarriers of a neighboring base station, and assign the set of transition guard subcarriers of the neighboring base station to one of uplink transmissions and downlink transmissions in a cell of the base station based on network conditions in the wireless communication network, and wherein the set of transition guard sub-carriers of the base station is non-identical to the set of transition guard subcarriers of the neighboring base station.

10. The apparatus of claim 9, wherein the set of transition guard sub-carriers of the base station is set to zero.

11. The apparatus of claim 9, wherein the set of transition guard subcarriers of the base station and the set of transition guard subcarriers of the neighboring base station use different frequency bands.

12. The apparatus of claim 9, wherein a single Fast Fourier Transform/inverse Fast Fourier Transform (FFT/IFFT) covering the bandwidth is used in the base station and a subscriber station for transmission.

13. The apparatus of claim 9, wherein the set of communication subcarriers are non-contiguous.

14. The apparatus of claim 9, wherein the base station is further configured to monitor one or more network conditions; and dynamically re-assign a number of subcarriers in the bandwidth for the uplink transmissions and the downlink transmissions in the cell of the base station by changing a frequency range of the set of transition guard sub-carriers of the base station based on the one or more network conditions, wherein the set of transition guard sub-carriers of the base station separates subcarriers for the uplink transmissions and subcarriers for the downlink transmissions and is non-identical to the set of transition guard sub-carriers of the neighboring base station.

15. A method of operating a base station, the method comprising:

assigning, by the base station, a first set of available subcarriers in a bandwidth to a set of transition guard subcarriers;

assigning a second set of the available subcarriers in the bandwidth to a set of communication subcarriers that includes a set of transition guard subcarriers of a neighboring base station; and assign the set of transition guard subcarriers of the neighboring base station to one of uplink transmissions and downlink transmissions in a cell of the base station based on network conditions in the wireless communication network, wherein the set of transition guard sub-carriers of the base station is non-identical to the set of transition guard subcarriers of the neighboring base station.

16. The method of claim 15, wherein the set of transition guard sub-carriers of the base station are set to zero.

17. The method of claim 15, wherein the set of transition guard subcarriers of the base station and the set of transition guard subcarriers of the neighboring base station use different frequency bands.

18. The method of claim 15, wherein a single Fast Fourier Transform/inverse Fast Fourier Transform (FFT/IFFT) covering the bandwidth is used in the base station and a subscriber station for transmission.

19. The method of claim 15, wherein the set of communication subcarriers is non-contiguous.

20. The method of claim 15 further comprising:

monitoring one or more network conditions; and dynamically re-assigning a number of subcarriers in the bandwidth for the uplink transmissions and the downlink transmissions in the cell of the base station by changing a frequency range of the set of transition guard sub-carriers of the base station based on the one or more network conditions, wherein the set of transition guard sub-carriers of the base station separates subcarriers for the uplink transmissions and subcarriers for the downlink transmissions and is non-identical to the set of transition guard sub-carriers of the neighboring base station.

* * * * *